United States Patent

[11] 3,597,570

[72] Inventors Nagao Saito;
 Kazuhiko Kobayashi; Susumu Niwa, all of Nagoya, Japan
[21] Appl. No. 826,837
[22] Filed May 22, 1969
[45] Patented Aug. 3, 1971
[73] Assignee Mitsubishi Denki Kabushiki Kaisha
 Tokyo, Japan
[32] Priority May 27, 1968
[33] Japan
[31] 43/35,838

[54] DEVICE FOR DETECTING SUSTAINED ARCING ACROSS ELECTROSPARK MACHINING GAPS
5 Claims, 5 Drawing Figs.
[52] U.S. Cl.................................................. 219/69 P,
 219/69 C
[51] Int. Cl...................................................... B23p 1/08
[50] Field of Search........................................ 219/69 C,
 69 F, 69 P

[56] References Cited
UNITED STATES PATENTS
3,483,347 12/1969 Losey........................... 219/69 (P)

Primary Examiner—R. F. Staubly
Attorneys—Robert E. Burns and Emmanuel J. Lobato

ABSTRACT: Each time a voltage across the machining gap due to each of applied pulses exceeds a predetermined above-arc magnitude, a timing capacitor is fully discharged by a shorting transistor triggered by a gap-coupled Zener diode. When the voltage is below the predetermined magnitude for a predetermined number of pulses, the capacitor is progressively charged until the voltage across the capacitor exceeds a predetermined magnitude and actuates an instrument for indicating that abnormal discharges are being effected across the gap.

DEVICE FOR DETECTING SUSTAINED ARCING ACROSS ELECTROSPARK MACHINING GAPS

BACKGROUND OF THE INVENTION

This invention relates to a device for detecting an electrical abnormality in electrospark machining gaps and a device for carrying out the same.

In general, electrical discharge machining apparatus, hereinafter referred to as electrospark machining, is used to intermittently effect electric discharges across a machining gap formed between a workpiece and a machining electrode through an electrically insulating medium, such as oil, presented in the gap thereby to electrically machine the workpiece. In such electrospark machining, however, abnormal modes of operation such as arcing or shorting can frequently appear in the machining gap. As a typical example, the electrically insulating medium disposed in the machining gap may be strongly ionized and therefore may become greatly decreased in dielectric strength. Under these circumstances, the application of a very low voltage across the gap can immediately cause an electric discharge across the latter. In apparatus having a voltage continuously supplied thereto, the discharge is sustained across the machining gap to form a continuous electric arc of high intensity which, in turn, contributes to the formation of large scars on the machined workpiece. This is known as the "sustained arc phenomenon." This sustained arc phenomenon can be often observed with electrospark machining apparatus utilizing the electric discharge of a capacitor. In order to detect the sustained arc phenomenon for such apparatus, it has already been proposed to electrically connect a resistor across the machining gap to take out the mean voltage across the gap. If the mean voltage approximates the arc voltage (which may be normally of about 20 volts) predominant in such a phenomenon, then one has determined the occurrence of the sustained arc phenomenon in the machining gap.

On the other hand, for the purpose of decreasing the size of scars formed on machined workpieces due to the sustained arc phenomenon, there have been recently proposed electrospark machining apparatus utilizing a train or series of machining voltage pulses having a pause period between each pair of successive pulses. In such apparatus, the pulses are successively and intermittently supplied across the machining gap so that even with an electrically insulating medium disposed in the gap have being decreased in dielectric strength, an electric discharge across the gap due to each pulse will terminate prior to the application of the next succeeding pulse thereacross. Thus the sustained arc phenomenon can be avoided. However, if each time one pulse has been supplied across the machining gap the corresponding electric discharge is established over the entire duration of that pulse, undesirable large scars may be formed on the machined workpiece as in the case of the sustained arc phenomenon. Therefore it is highly desirable to provide means for detecting the abnormal mode of operation of the apparatus utilizing the intermittent pulses. However the detection method as previously described has been found to be unsatisfactory for such apparatus.

SUMMARY OF THE INVENTION

Accordingly it is an object of the invention to provide a new and improved device for accurately detecting an abnormal mode of operation performed by the electrospark machining gap which method is particularly effective for use with electrospark machining apparatus of the type utilizing a train of intermittent pulses having a pause period between each pair of successive pulses.

The device suitable for use with an electrospark machining gap formed between a machining electrode and a workpiece and having a voltage applied thereacross comprises a first element having a voltage thereacross varying from its first predetermined magnitude under a predetermined condition and with time, a second element responsive to the voltage applied across the machining gap to be operative when that portion of the voltage higher than the arc voltage appears across the machining gap such that the voltage across the first element is discontinued in variation and again varied from its first predetermined magnitude under the predetermined condition and with time, and actuator means responsive to the voltage across the first element having varied from its first predetermined magnitude to its second predetermined magnitude to be operated whereby the abnormal mode of operation is detected.

In a preferred embodiment of the invention, the first element may preferably be a capacitor charged by a source of direct current and having a voltage thereacross increasing from substantially its null magnitude with a fixed time constant, and the second element may include a transistor having an emitter-to-collector circuit connected across the capacitor and operative when conducting to discontinue an increase in voltage across the capacitor and permit the latter to be again charged from substantially null magnitude with the time constant, and a Zener diode responsive to the voltage applied across the machining gap to become conducting when a voltage higher than the arc voltage appears across the machining gap whereupon the transistor is rendered conductive.

BRIEF DESCRIPTION OF THE DRAWING

The invention will become more readily apparent from the following detailed description taken in conjunction with the accompanying drawing in which.

DESCRIPTION OF THE PREFERRED EMBODIMENT

Figure 1:
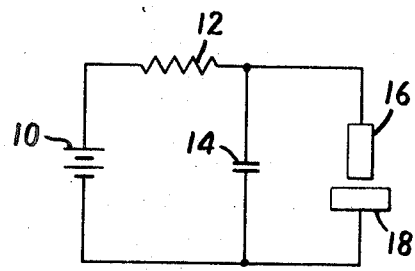
FIG. 1 is a schematic circuit diagram of an electrospark machining apparatus using a capacitor type relaxation oscillator.
Figure 2:
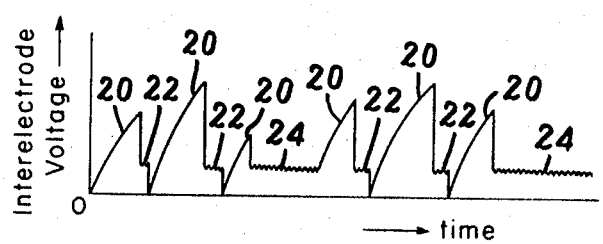
FIG. 2 is a graph illustrating waveform developed across the associated electrodes shown in FIG. 1.

Referring now to FIG. 1 of the drawing, there is illustrated one form of electrospark machining circuit of the conventional design using a capacitor type relaxation oscillator. The arrangement illustrated comprises a source 10 of direct current, and a charging resistor 12 and a capacitor 14 connected in series with the source 10. The capacitor 14 is connected across a machining gap formed between a machining electrode 16 and a workpiece 18. When the source 10 has charged the capacitor 14 to a predetermined voltage substantially equal to the breakdown voltage of the electrically insulating medium (not shown) flowing through the machining gap, the charge on the capacitor is impulsively delivered to the machining gap to electrically machine the workpiece 18. This process is repeated until the workpiece 18 is electrically machined into a shape complementary to that of the machining electrode. In FIG. 2 there is shown a typical waveform of the varying voltage which is developed across the machining gap formed of the electrode and workpiece 16 and 18, respectively, in the electrospark machining apparatus as above described. In FIG. 2, the ordinate represents a voltage applied across the machining gap or an interelectrode voltage and the abscissa represents time. For the normal mode of electrospark machining operation, the capacitor 14 is first charged along an exponential curve 20 as shown in FIG. 2 from the source 10 through the resistor 12 until the voltage thereacross reaches a breakdown voltage of the associated electrically insulating medium. At that time, the charge on the capacitor 14 is impulsively delivered to the machining gap 16, 18 to cause a normal electric discharge of short duration across the gap. This discharge serves to electrically machine the workpiece 18 and has a voltage as designated by a substantially horizontal line 22 with very minute pulsations.

However, the experiences encountered in operating electrospark machining apparatus such as shown in FIG. 1 indicated that abnormal modes of operation could frequently occur in the machining gap resulting in the sustained arc phenomenon as previously described. With the sustained arc phenomenon developed, a sustained electric arc may have a voltage as designated at line 24 following an exponential curve 20 and similar to but longer in duration than line 22 in FIG. 2.

In the arrangement such as shown in FIG. 1, the sustained arc phenomenon could be effectively detected by connecting a suitable resistance across the machining gap and analyzing the mean voltage developed across the resistance as previously described. The voltage across the machining gap designated by the line 22 or 24 is generally far less than the voltage at the beginning of the electric discharge cycle and is normally of about 20 volts. According to the measure as above described, the occurrence of the sustained arc phenomenon is determined by analyzing the detected mean voltage across the resistance.

Figure 3:
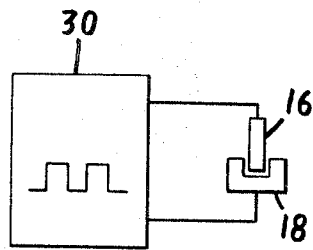
FIG. 3 is a schematic circuit diagram of another electrospark machining apparatus utilizing intermittent voltage pulses.

As previously described, apparatus having intermittently supplied across the machining gap successive pulses having a pause period between each pair of successive pulses can impart scars on the machined workpiece. FIG. 3 shows an electrospark machining circuit of the type just described wherein a generator 30 for generating a train of voltage pulses is connected across a machining electrode 18 and a workpiece 16. Thus it will be seen that a train of voltage pulses such as shown within the block 30 is applied across the machining gap formed between the electrode and workpiece 16 and 18 respectively. In other words, the pulses are intermittently applied across the gap. This means that no voltage is applied across the machining gap during each interval of time for which the pulse pauses. Therefore even if an electrically insulating medium disposed in the gap greatly decreases in dielectric strength, it is possible to eliminate the sustained arc phenomenon because the continuity of electric discharge is broken.

However, the apparatus such as shown in FIG. 3 also has the disadvantage, as previously described in that that the particular machining solution, such as the above-mentioned insulating medium, may decrease in its spouted amount or the surface of the workpiece to be machined may be small as compared with the machining current flowing through the machining gap. Therefore it is highly desirable to detect the abnormal mode of operation performed by the machining gap in electrospark machining apparatus utilizing the intermittent pulses.

It is, however, undesirable to apply to such apparatus the above-mentioned method of detecting the mean voltage supplied to the machining gap for the following reasons. Each of the intermittent pulses is followed by one pause period which is varied in accordance with the type of material to be machined, the machining type, such as rough or precision machining, etc. A variation in the pause period causes a change in the mean voltage applied across the machining gap. This changes the criterion for determining the abnormal mode of operation thereby making such determination difficult.

The invention contemplates to accurately determine the abnormal mode of operation even in electrospark machining apparatus of the type wherein machining voltage pulses are intermittently applied across the machining gap with one pause period following each pulse.

The invention is based upon the principle of detecting whether or not a voltage higher than the arc voltage is applied across the machining gap.

Figure 4:
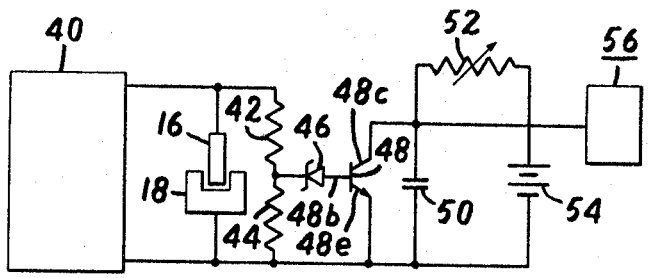
FIG. 4 is a schematic diagram of an electrospark machining circuitry embodying the principles of the invention.

Referring now to FIG. 4, there is illustrated an electrospark machining circuit embodying the principles of the present invention. As in FIG. 3, a pulse generator 40 is connected across a machining gap formed between a machining electrode 16 and a workpiece 18. The generator 40 is of well-known construction by which pulses are intermittently generated while one pause period follows each pulse and may be, for example, of the type disclosed in U.S. Pat. No. 3,292,040 to Werner Ullmann and Fritz Gravert. Only for purpose of illustration, it is assumed that the pulse generator 40 generates pulses having a duration of 500 microseconds with a pause period ranging from 0 to 1 second. As above stated, the pause period is variable in accordance with the type of material to be machined and the type of machining to be done such as rough machining or precision machining. The materials of the electrode and workpiece determine which of them is to be connected to the positive side of the output of the pulse generator 40. In FIG. 4 the generator 40 is shown as having the positive side of the output connected to the machining electrode 16 and the negative side thereof connected to the workpiece 18. It is to be understood that the machining gap between the electrode and workpieces 16 and 18 respectively is filled with any suitable electrically insulating medium, such as oil, although such a medium is not illustrated.

As shown in FIG. 4, the machining gap 16, 18 is electrically connected across a voltage dividing network consisting of a pair of resistors 42 and 44 serially connected to each other. The junction of both resistors 42 and 44 is connected to a Zener diode 46 at its cathode electrode. The Zener diode 46 is responsive to a voltage at the junction of the resistors 42 and 44 above a predetermined positive magnitude with respect to the junction of the resistor 44 and workpiece 18 to exhibit the Zener characteristic thereby to provide a reference voltage or output signal for the purpose which will be apparent hereinafter. The Zener diode 46 has its anode electrode connected to a base electrode 48b of an NPN type transistor 48. This transistor 48 includes an emitter electrode 48e connected to the junction of the resistor 44 and the workpiece 18 and a collector electrode 48c connected to one pole of a capacitor 50 connected on the other pole to the emitter electrode 48e of the transistor 48.

The capacitor 50 is connected in series with a variable resistor 52 and a source 54 of direct current, with the positive terminal thereof connected to the variable resistor 52 and with the negative terminal thereof connected to the emitter electrode 48e of the transistor 48.

Figure 5:
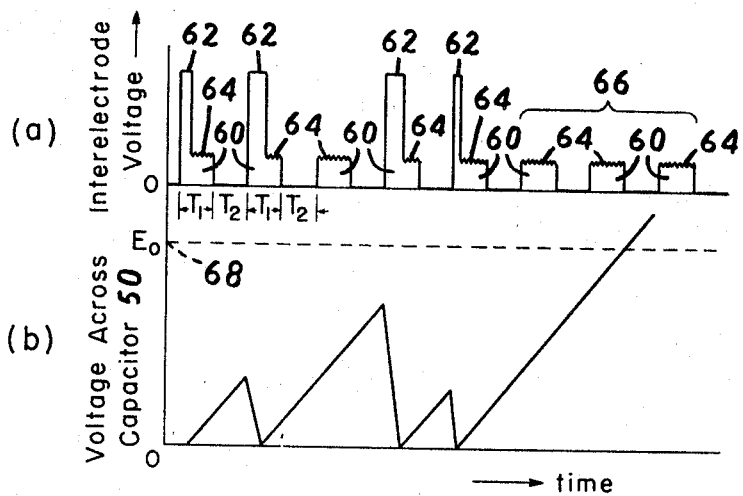
FIGS. 5a and 5b are graphical representation of waveforms useful in explaining the operation of the invention.

Referring now to FIG. 5a, there is illustrated a graph plotting a voltage applied across the machining gap as shown in FIG. 4 (in ordinates) against time (in abscissas). The pulse generator 40 applies to the machining gap between the electrode and workpiece 16 and 18 respectively a train of voltage pulses 60 having a duration of $T_1$ sandwiched between pause periods of $T_2$. It is recalled that the duration has been assumed to be equal to 500 microseconds and the pause period has been assumed to range from 0 to 1 second. The pulse 60 consists of two pulse portions 62 and 64. The pulse portion 62 corresponds to a noload voltage portion on which no electric discharge occurs across the machining gap and is, of course, higher than the arc voltage for an electric discharge occurring across the gap. The noload voltage is preferably of a high magnitude sufficient to initiate an electric discharge across the machining gap and may be for example of 80 volts. The arc voltage may be, for example, of about 20 volts and is designated by the pulse portion 64 having very minute pulsations as shown in FIG. 5a.

On the other hand, a ratio between resistance valves of the resistors 42 and 44 is preselected such that the occurrence of the noload voltage portion 62 of each pulse 60 across the machining gap causes a voltage drop to be developed across the resistor 44 sufficient to break down the Zener diode 46 while the Zener diode 46 remains nonconductive for the arc voltage applied across the gap. For example, with the noload and arc voltages having the respective magnitudes as above specified, the resistors 42 and 44 may be of 10 and 3.3 kilohms respectively so that the resistor 44 has developed thereacross a voltage drop of about 20 volts for the noload voltage of each pulse and of about 5 volts for the arc voltage thereof while the Zener diode 46 has a Zener voltage of about 12 volts.

The breakdown of the Zener diode 46 permits the transistor 48 to be supplied with a base current to render the collectorto-emitter circuit of the transistor 48 fully conductive resulting in the capacitor 50 short-circuiting. On the contrary, if the arc voltage portion 64 is applied across the machining gap, then the Zener diode 46 remains nonconducting thereby presenting a very high resistance to the collector-to-emitter circuit of the transistor 48.

The capacitor 50 is charged from the source 54 through the variable resistor 52 so that the voltage across the capacitor 50 increases under a predetermined condition and with time. That is, it is charged at a charging rate dependent upon the time constants of the same and the variable resistor 52. With the associated circuit parameters specified above, the capacitor 50 may have a capacitance of 0.2 microfarad, the variable resistor 52 may have its maximum resistance of 50 kilohms and the source 54 may be 24 volts.

While the values of the various components have been mentioned, it is to be understood that the invention is not restricted thereto or thereby and that they may vary for the particular application. FIG. 5b shows the voltage variation across the capacitor 50 with respect to the time basis identical to that for FIG. 5a.

As above described, the occurrence of the noload voltage portion 62 across the machining gap causes the capacitor 50 to short circuit through the now conducting transistor 48. This results in zero voltage across the capacitor 50. Therefore each time the noload portion 62 begins to be developed across the machining gap the capacitor 60 is discharged to the zero voltage level as shown in FIG. 5b. However, for both the duration of the arc voltage portion 64 and the pause period $T_2$, the transistor 48 is prevented from short-circuiting the capacitor 50 because of no occurrence of any voltage exceeding the arc voltage as shown in a time zone labeled by reference numeral 66 in FIG. 5a. The capacitor 50 is never discharged during this mode of operation and will continue to be charged to progressively increase in voltage under the predetermined condition as shown at the rightmost inclined segment in FIG. 5b. When the voltage across the capacitor 50 has reached a predetermined magnitude or the reference voltage $Eo$ (see FIG. 5b), in this case 12 volts, or when the inclined segment has intersected a dotted horizontal line 68 shown in FIG. 5b, one determines the occurrence of the abnormal mode of operation in the machining gap in the manner as will be described hereinafter.

If any one of the noload voltage portions 62 appears across the machining gap before the voltage across the capacitor 50 reaches the reference voltage $Eo$, then the transistor 48 short circuits the capacitor 50 to reduce the voltage across the latter to zero magnitude as above described. Thereafter the capacitor 50 begins to again be charged from the zero voltage under the predetermined condition as previously described.

Assuming that the transistor 48 does not short circuit the capacitor 50, an interval of time during which the voltage across capacitor 50 has increased from the zero magnitude to the reference magnitude $Eo$ will be constant provided that both the capacitance of the capacitor 50 and the resistance of the variable resistor 52 remain constant. If that interval of time is assumed to be constant, then whether or not the noload voltage portion 62 has been detected by the voltage across the capacitor 50 having not reached or reached the reference magnitude $Eo$ within the constant interval of time may hereinafter be called a "reference time." For example, if none of the noload voltage pulse portions 62 have been developed across the machining gap within the reference time, one has determined that the abnormal mode of operation has been and is being performed by the gap.

It will be readily understood that the time constant of the capacitor 50 and therefore the reference time can be charged or variably set by varying the resistance of the variable resistor 52. The reference time may be preferably long enough to permit at least 10 voltage pulses 60 including the pause periods $T_2$ following them to appear within the same. With the pause period disposed between each pair of successive pulses, although an arc discharge has been effected throughout the duration of each of the two or three successive pulses, the presence of the pulse periods can effectively bring the machining gap into the normal mode of operation. If the reference time is too short, the detection of the abnormal mode of operation will be undesirably accomplished many times more than necessary resulting in a decrease in machining efficiency.

After the voltage across the capacitor 50 has reached the reference magnitude $Eo$ which is indicative of the occurrence of the abnormal mode of operation, such is detected by an actuation device 56 connected to the capacitor 50 (see FIG. 4) which is operated in response to that voltage. The device 56 may have any well-known construction and it may be, for example, a relay device operative in response to an applied voltage having the reference magnitude $Eo$. As well-known, the actuation device 56 is operative to change the mode of operation of the machine and responds to such a voltage either to stop the operation of the source 40 to prevent the voltage pulses from being applied across the machining gap, or to operate the associated feed mechanism to move one of the electrode and workpiece away from the other thereby to increase the gap for the purpose of bringing the gap into the normal mode of operation.

While the invention has been described in terms of the electrospark machining apparatus utilizing intermittent pulses, it is to be understood that apparatus utilizing the discharge of the capacitor may be effectively controlled by the detection device including the resistors 42 and 44, the Zener diode 46, the transistor 48, the capacitor 50, the variable resistor 52 and the source 54.

More specifically, the resistors 42 and 44 may be respectively connected at one end to the machining electrode 16 and the workpiece 18 in the arrangement as shown in FIG. 1. Then the Zener diode 46 is selected to have such Zener characteristic that it remains nonconducting for any voltage less than a voltage across the machining gap on the occurrence of either the normal machining arc or the sustained arc across the gap, that is, the arc voltage as shown in FIG. 2 and is broken down for any voltage higher than the arc voltage. Assuming that the source 10 of direct current has a voltage of 80 volts thereacross, the arc voltage may be of about 20 volts and the Zener diode may be broken down, for example, for a voltage above 30 volts.

As in the arrangement as shown in FIG. 4, if the Zener diode is not broken down within a predetermined time, such as the reference time as above described, the voltage across the capacitor reaches a reference voltage which detects the occurrence of the abnormal mode of operation within the machining gap.

With the electrospark machining apparatus utilizing the discharge of the capacitor, the voltage applied across the machining gap has no pause period. Therefore the reference time upon which the detection of the abnormal mode of operation is based is set to be relatively short. It has been found that, assuming that the normal mode of operation continues, the reference time is preferably long enough to permit the appearance of a plurality, for example, three to five exponentially increasing curves, such as shown at 20 in FIG. 2, within the same.

What we claim is:

1. A device for detecting the sustained arcing mode of operation of an electrical discharge machining apparatus having a machining gap formed between a machining electrode and a workpiece comprising: circuit means connected across the machining gap during use of the device for repeatedly providing an output signal only when the voltage across said gap is greater than the voltage occurring thereacross during arcing; a source of direct current; a capacitor connected across said source of direct current to be charged thereby; electric circuit means connected to said circuit means for repeatedly effecting discharge of said capacitor in response to said output signals and preventing discharge of said capacitor during the absence of an output signal; and detecting means for detecting when said capacitor has charged to a predetermined voltage level indicative of the sustained arcing mode of operation of the electrical discharge machining apparatus.

2. A device according to claim 1 wherein said circuit means includes a zener diode having a cathode electrode connected across said machining gap and having an anode electrode; and wherein said electric circuit means includes a transistor having base, collector and emitter electrodes, means connecting said base electrode to said anode electrode, and means connecting said base electrode to said anode electrode, and means connecting said collector and emitter electrodes to opposite sides of said capacitor.

3. A device according to claim 1 including means for variably setting the time constant of said capacitor.

4. A device according to claim 1 wherein said detecting means includes actuator means for changing the mode of operation of the electrical discharge machining apparatus in response to detection of said predetermined voltage level.

5. A device for detecting the arcing or shorting mode of operation performed by an electrospark machining gap formed between a machining electrode and a workpiece, comprising: a source of direct current; a capacitor connected across said source of direct current and having a varying voltage thereacross increasing from substantially a null magnitude with a variably set time constant; circuit means including a transistor having base, collector and emitter electrodes and an emitter-to-collector circuit connected across said capacitor operative when conducting to discharge said capacitor and permit the latter to be again charged from substantially null magnitude when said time constant, and a Zener diode connected to said base electrode of said transistor responsive to the voltage applied across said machining gap to be conducting when a voltage higher than the arc voltage appears across said machining gap whereupon said transistor is rendered conductive to discharge said capacitor; and actuator means responsive to the voltage across said capacitor having varied from said null magnitude to another predetermined magnitude indicative of said arcing or shorting mode of operation for changing the mode of operation of the machine.